(12) United States Patent
Hatass et al.

(10) Patent No.: US 7,686,348 B2
(45) Date of Patent: Mar. 30, 2010

(54) DEVICE FOR CONNECTING LINES INCLUDING ANNULAR CAVITY JOINT

(75) Inventors: Dirk Hatass, Gründau (DE); Volker Naumann, Bad Orb (DE)

(73) Assignee: Veritas AG, Gelnhausen (DE)

( * ) Notice: Subject to any disclaimer, the term of this patent is extended or adjusted under 35 U.S.C. 154(b) by 212 days.

(21) Appl. No.: 11/145,979

(22) Filed: Jun. 7, 2005

(65) Prior Publication Data

US 2005/0285393 A1  Dec. 29, 2005

(30) Foreign Application Priority Data

Jun. 8, 2004  (DE) .................. 10 2004 027 831

(51) Int. Cl.
*F16L 13/02*  (2006.01)

(52) U.S. Cl. .............. 285/288.1; 285/319; 285/331

(58) Field of Classification Search ........... 285/331, 285/332, 332.1, 148.19, 148.22, 21.1, 319, 285/288.1

See application file for complete search history.

(56) References Cited

U.S. PATENT DOCUMENTS

| 545,877 | A | * | 9/1895 | Curlett | 285/356 |
| 3,234,643 | A | * | 2/1966 | Hollander | 228/114 |
| 3,360,826 | A | * | 1/1968 | Lorang | 425/392 |
| 3,408,091 | A | * | 10/1968 | Zylstra | 285/7 |
| 3,439,944 | A | * | 4/1969 | Bernhard | 285/321 |
| 3,562,896 | A | * | 2/1971 | Wilson | 29/443 |
| 4,739,828 | A | * | 4/1988 | Bayer et al. | 165/173 |
| 4,754,994 | A | * | 7/1988 | Melzer et al. | 285/259 |
| 4,892,227 | A | * | 1/1990 | MacLaughlin | 220/270 |
| 5,366,253 | A | * | 11/1994 | Nakashiba et al. | 285/21.2 |
| 5,553,753 | A | * | 9/1996 | Abplanalp | 222/387 |
| 5,567,505 | A | * | 10/1996 | Dehennau et al. | 428/188 |
| 5,613,794 | A | * | 3/1997 | Isaac et al. | 403/265 |
| 5,636,875 | A | * | 6/1997 | Wasser | 285/21.1 |
| 6,053,214 | A | * | 4/2000 | Sjoberg et al. | 138/134 |
| 6,199,916 | B1 | * | 3/2001 | Klinger et al. | 285/288.1 |
| 6,733,047 | B1 | * | 5/2004 | Stieler | 285/319 |

FOREIGN PATENT DOCUMENTS

| DE | 39 03 551 A1 | 8/1989 |
| DE | 39 41 236 A1 | 6/1990 |
| EP | 0 988 488 B1 | 4/2004 |
| FR | 2 737 548 | 2/1997 |

* cited by examiner

*Primary Examiner*—James M Hewitt
*Assistant Examiner*—Jay R Ripley
(74) *Attorney, Agent, or Firm*—Buchanan Ingersoll & Rooney PC

(57) ABSTRACT

The invention relates to a device for connecting lines, especially to a quick-connector, having at least two connections, with at least one connection thereof comprising two extensions to form a receiving portion for a line end, wherein one of said two extensions has a first section and a second section with a wall thickness larger than that of the first section. According to the invention a process optimization of the mounting processes is achieved by providing a transition with a wall on the side of the receiving portion between the two sections of the extension, which is curve-shaped in the longitudinal direction of the connecting device.

10 Claims, 3 Drawing Sheets

DEVICE FOR CONNECTING LINES INCLUDING ANNULAR CAVITY JOINT

The invention relates to a device for connecting lines, especially to a quick-connector, having at least two connections, with at least one connection thereof comprising two extensions to form a receiving portion for a line end, wherein one of said two extensions has a first section and a second section with a wall thickness larger than that of the first section. The invention further relates to a motor vehicle comprising such a connecting device, and to a method for connecting lines by means of such a connecting device.

A connecting device of the aforementioned type is known, for example, from EP 0 988 488 B1.

Devices for connecting lines, especially quick-connectors, are commonly used in fuel systems or ventilating systems. Such connecting devices have to ensure a stable and secure connection of fluid-conveying lines so that the medium conveyed in the lines cannot escape at the connecting device. The security of the connection is particularly relevant for the coupling of pressure lines. Moreover, fuel systems have to satisfy strict legal standards with respect to the emission of hydrocarbons. Connecters used in fuel systems therefore have to effectively suppress the permeation of hydrocarbons.

The conventionally used quick-connectors are provided with a hose connection which comprises a connection piece, on the outside of which several rolls or, respectively, hook-shaped undercuts (Christmas tree structure) are disposed. A hose pushed onto such a connection piece forms a positive, mechanically stable connection with the same, which does not satisfy the increased demands on the impermeability of the quick-connector, however, especially with respect to the permeation of hydrocarbons.

Other connection alternatives, e.g. laser welding, require the use of specific transparent materials, which are relatively expensive and limit the choice of materials. Excellent results with respect to the stability and impermeability of the connections are achieved by gluing quick-connectors and lines together. This connection type is relatively costly, however, and is therefore not suited for each price sector.

A comparatively inexpensive, but high-quality—i.e. impermeable and stable—connection between a quick-connector and a line may be achieved by friction welding.

In this respect, the parts to be connected are brought into a relative rotation, wherein, due to the relative motion between both parts and due to the frictional heat generated thereby on the contact surfaces, the rim zones of both parts melt open and are bonded. In this way, an integral connection between the line and the quick-connector is produced which is both mechanically stable and gas- or liquid-proof. Moreover, there is a large choice of materials, especially synthetic materials, suited for friction welding.

With friction welding it is important that a contact surface as large as possible is provided between the parts to be connected so as to obtain a welding surface as large as possible. For this reason, the connections of quick-connectors are commonly designed as concentric double cylinders between which an annular groove is provided for receiving the line end. Thus, the inside of the pipe to be welded is welded together with the outside of the inner cylinder and the outside of the pipe is welded together with the inside of the outer cylinder.

Examples for such line connections are known from FR 2 737 548, DE 39 41 236 A1 and DE 39 03 551 C2.

For pushing the end of the pipe into the annular gap more easily said gap is provided with a surrounding chamfer in the region of the entrance port, which—in a manner known per se—also serves to center the pipe.

It is moreover known from FR 2 737 548 to select the outer diameter of the inner cylinder such that the pipe is expanded when pushed onto the inner cylinder, so that an additional improvement of the stability of the connection is achieved.

These known quick-connectors have the disadvantage that, despite the chamfer on the free end of the cylinder, an automated mounting of the quick-connector onto the line is only hard to accomplish.

An improvement is provided by the quick-connector known from the generic document EP 0 988 488 B1, which also comprises a connection with two annular extensions. With this known quick-connector the groove receiving the line end is formed with tapering inner surfaces. This means that the outer surface of the inner extension is formed as a cone. By this, it is achieved that the pipe is expanded when pushed onto the inner annular extension and remains centered during the entire mounting procedure.

This known quick-connector has the disadvantage, however, that the end of the pipe is compressed more strongly in the region of the groove base than in the region of the entrance port of the annular groove. This results in different contact pressures along the welding surface and, thus, in an uneven welding. Moreover, the known quick-connector is suited only for relatively elastic, especially multi-layered plastic pipes. Since, in addition, it requires a relatively large amount of force to stick the pipe onto the quick-connector, the known quick-connector is suited for the automated mounting to a limited extent only.

Therefore, it is the object of the invention to provide a device for connecting lines which allows a process-optimized adaptation particularly to automated mounting processes. The invention is further based on the object to provide a motor vehicle comprising such a connecting device, and a method for connecting lines.

According to the invention the object with respect to the connecting device is achieved by the subject matter of claim 1. With respect to the motor vehicle the object is achieved by the subject matter of claim 7 and with respect to the method by the subject matter of claim 8.

The invention has the advantage that a flexible adaptation of the geometry of the quick-connector to specific mounting requirements is allowed due to the provision of a transition between both sections having a different wall thickness and due to the curve-shaped design of the transition wall on the side of the receiving portion, so that mounting processes, especially automated mounting processes, can be optimized. The curve-shaped design of the transition wall can, in particular, influence the push-on characteristic of the quick-connector, e.g. by considering the elasticity of the pipe or hose to be connected. Moreover, it is achieved by the curve-shaped design of the transition wall that the expansion of the pipe takes place only in the transitional region so that the pipe is constantly expanded in the region of the second section with the larger wall thickness and an even contact pressure is thus exerted in this region. By this, the quality of the weld connection is improved.

According to a preferred embodiment of the invention, one section of the wall is concave in the region of the first section of the extension. Thus, a particularly smooth transition is produced in the region of the first section so that the pipe is easy to push on with a small resistance.

Moreover, one section of the wall may be convex in the region of the second section of the extension so that the transition in the region of the second section is continuous. In this way, the expanded pipe can conform to the inner extension over a greater length so that the contact surface available for the friction welding is enlarged. This is particularly advantageous for pipes having a smaller elasticity.

It has shown that particularly good results are achieved if the inflection point between the concave and convex sections of the wall is disposed in the region of the entrance port of the receiving portion. Another process-optimized embodiment of the geometry of the connection may be accomplished by that the concave and the convex sections of the wall are approximately equally long. Both of these measures each result in the secure expansion and, simultaneously, the centering of the pipe.

Moreover, a free end of at least one of the extensions may be bulged.

In the following, the invention will be explained, e.g. with further details, with reference to the attached drawings. In the drawings.

Figure 1:
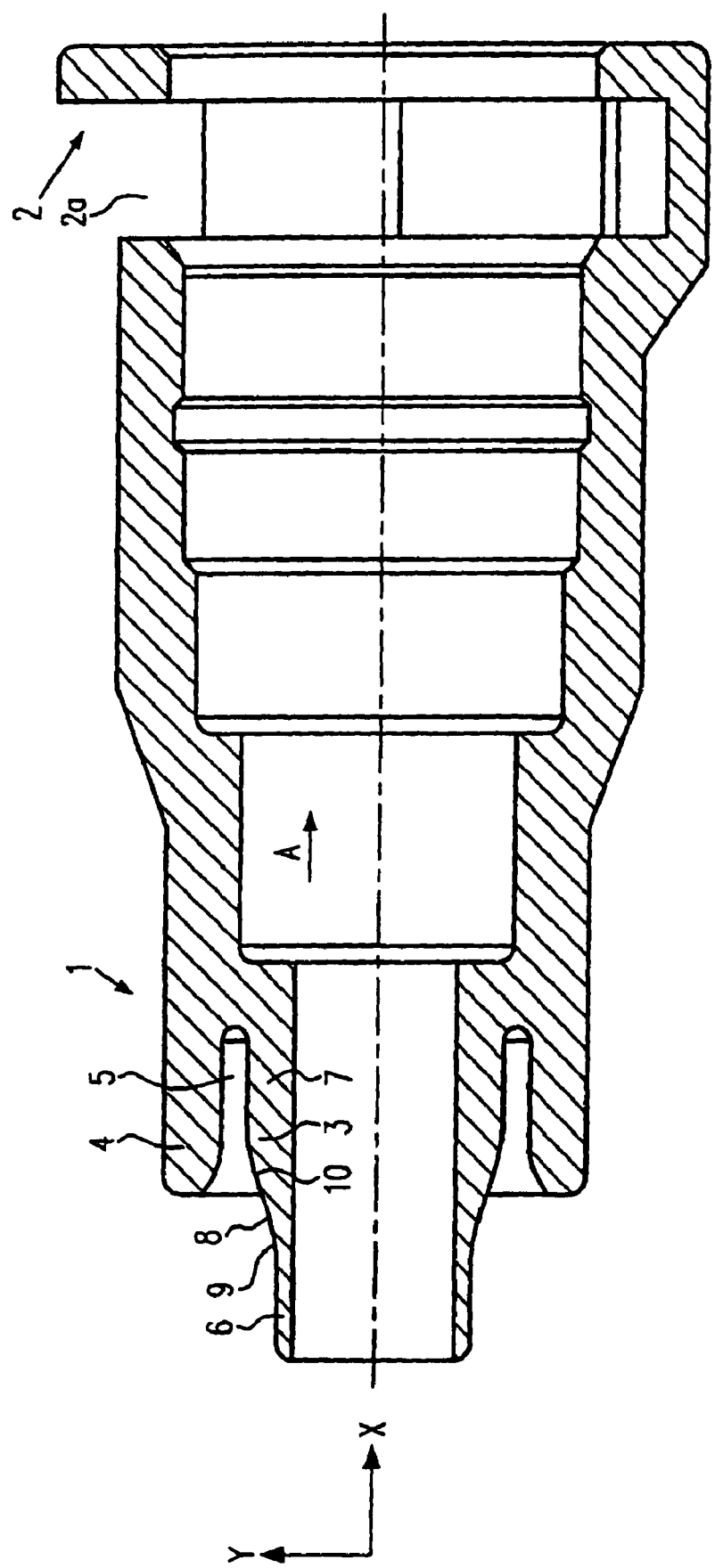
FIG. 1 shows a longitudinal section through an embodiment of the connecting device according to the invention.

FIG. 1 shows a connecting device according to the invention in the form of a quick-connector, which is especially used for connecting fuel hoses in motor vehicles. This connecting device comprises two connections 1, 2 each being provided on the axial end of the device. The invention is not limited to connecting devices or quick-connectors having two connections only, although these constitute, of course, the common construction for such line couplings.

The right connection 2 shown in FIG. 1 is provided to receive a line which may be fixed by a clip not illustrated which is introduced in the recess 2a.

The left connection I shown in FIG. 1 is provided for connecting the device to a line by means of friction welding. To this end, the connection 1 comprises two extensions 3, 4 which are designed, for example, as annular extensions, by means of which the welding by a rotatory relative motion is allowed. If the welding is to be accomplished by an axial relative motion only, extensions having different geometries are possible as well.

The two extensions comprise an outer extension 4 and an inner extension 3 which are arranged concentrically to each other. An annular gap is formed as receiving portion 5 between the two extensions 3, 4 into which the line end is pushed for welding. Relative to the wall thickness of the line, the width of the receiving portion 5 is thereby dimensioned in the radial direction such that the outside of the line is adjacent to the inside of the outer extension 4 and the inside of the line to the outside of the inner extension 3, by which two concentric contact surfaces are formed.

Figure 3:
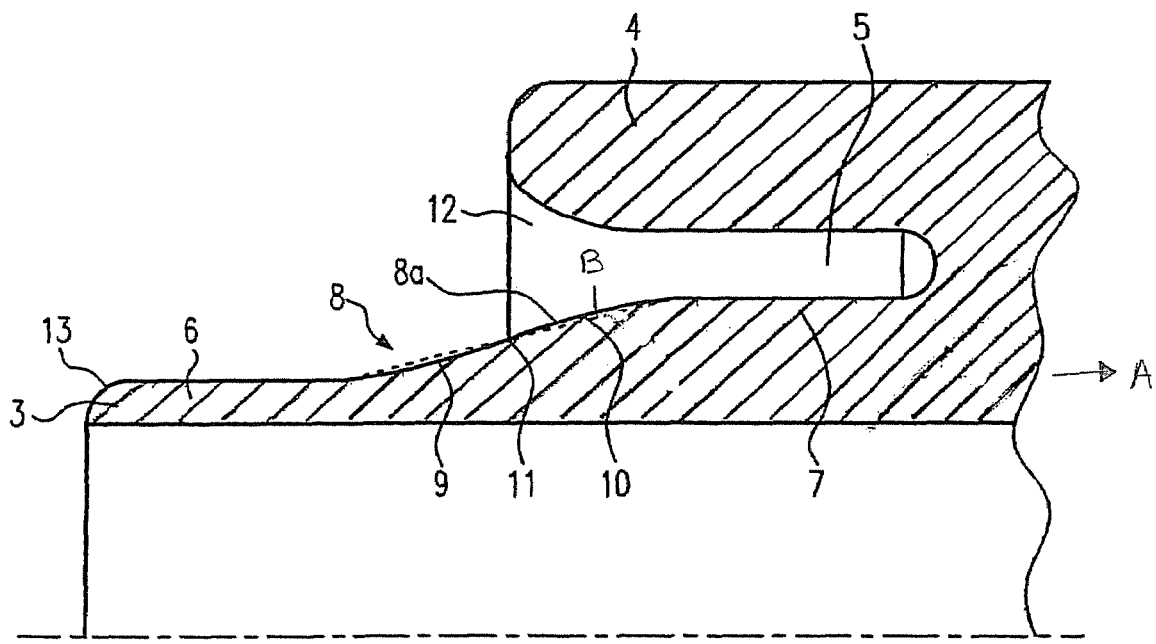
FIG. 3 shows an enlarged partial section of the connection of the connecting device shown in FIG. 1 provided for the friction welding.
Figure 4:
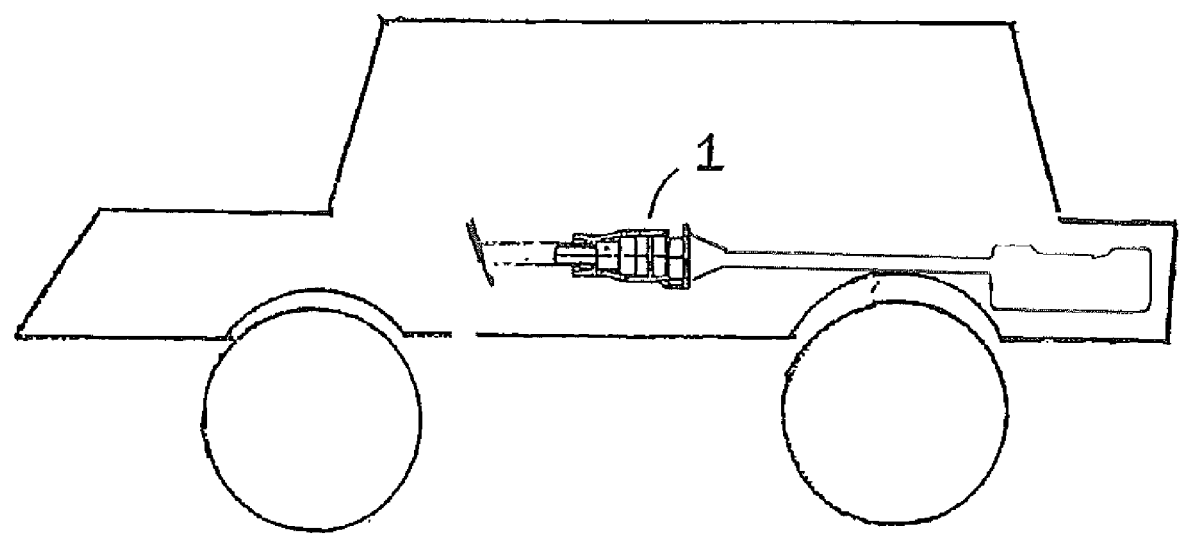
FIG. 4 shows a motor vehicle including the connecting device.

In FIG. 1 and especially in FIG. 3 it is shown that the inner extension 3 has two substantially cylindrical sections 6, 7 spaced apart from each other.

The rear section 7 (second section) in the longitudinal direction A of the connecting device, i.e. section 7 on the side of the connecting device, has a larger wall thickness than the front section 6 (first section) in the longitudinal direction A, i.e. section 6 on the side of the line. In other words, the outer diameter of the rear section 7 is larger than the outer diameter of the front section 6. Moreover, at least the rear section 7 delimits the receiving portion 5 in the circumferential direction.

This means, that the rear section 7 contacts the line end and is welded together with an inner surface of the line end. By the larger wall thickness of the rear section 7 the stability thereof is increased so that the rear section 7 is loadable during the friction welding, but also during the operation, i.e. in the connected state.

In general, it is important that the outer diameter of the rear section 7 is larger than the outer diameter of the front section 6 so as to achieve the expansion of the line end.

In case of need, e.g. if only small loads of the rear section 7 are to be expected, the difference of diameters between the rear and the front section 6, 7 may be realized in a different manner. Thus, it is possible to select the same wall thickness instead of different wall thicknesses for the front and rear section 6, 7 and to obtain the larger outer diameter of the rear section 7 by an expansion of the rear section 7.

A transition 8 is provided between the two sections 6, 7 which compensates for the difference in height between the two sections 6, 7.

As is shown in FIG. 3, the transition 8 comprises a wall 8a on the side of the receiving portion, which is curve-shaped, as results from the comparison with an imagined dashed straight line B connecting both sections 6, 7. Wall 8a particularly comprises a first section 9 being arched in a concave manner. This concave section 9 changes into a second section 10 being arched in a convex manner. An inflection point 11 is positioned between both sections 9, 10.

The front section 6 of the inner extension 3 in the longitudinal direction is substantially cylindrical and continuously changes into the concave section 9 of wall 8a of the transition 8. The convex section 10 of wall 8a joining the concave section 9 likewise continuously changes into the rear section 7 of the inner extension in the longitudinal direction. This rear section 7 is likewise substantially cylindrical.

In the embodiment shown in FIG. 3 the wall 8a is formed such that the concave and the convex sections 9, 10 are approximately equally long. Moreover, the inflection point 11 is disposed in the region of the entrance port 12 of the receiving portion 5. This embodiment is to be understood as an example. Depending on the different mounting requirements, the run of the curve of wall 8a, i.e. the gradient or the bend of the individual sections 9, 10, and/or the respective length thereof, i.e. the position of the inflection point 11, may be influenced so as to optimize the process.

It is possible, for example, to displace the inflection point 11 closer to the rear section 7 so that the expansion of the pipe in the region of section 9 takes place gradually and is then increased in the region of the steeper section 10, so that a threshold has to be overcome. Moreover, it is possible to extend the rear section 7 by displacing the transition 8 as a whole in the direction of the free end of the inner extension 3, so that the front section 6 is shortened. By this, an enlargement of the welding surface is achieved.

In the present example, the length of the inner extension 3 is larger than the length of the outer extension 4. Of course, it is possible to form the outer extension 4 longer than the inner extension 6 and to realize the section of the inner extension 3 shown in FIG. 1 on the outer extension 4. Apart from the geometry of the curves in accordance with the invention, the basic structure of this connection would correspond to the connection shown in FIG. 3 of FR 2 737 548, wherein the inner cylinder is shorter than the outer cylinder. Of course, it is also possible to realize the inner and the outer extension with equal lengths which, apart from the geometry of the curves in accordance with the invention, is in principle shown in FIG. 1 of FR 2 737 548.

The polynomial section shape of the inner extension 3 as shown in FIG. 3 may be represented, for example, by the following equation:

$$Y=0.0002x^5-0.006x^4+0.0493x^3-0.1395x^2+0.1539x+2.8929.$$

The shape of the section of the outer extension 4 can be represented by the following equation:

$$y=0.0059x^5+0.2301x^4-3.5969x^3+27.939x^2-107.86x+173.91$$

The coordinates refer to the longitudinal axis of the connecting device as center line, the zero point of which is positioned at the front edge of the free end of the inner extension 3.

It has proved to be particularly advantageous if the ratio between the outer diameter of the front section 6 and the outer diameter of the rear section 7 is in a range of 0.6 to 0.9, especially at 0.8. The outer diameter of the front, narrower section 6 may be between 5 and 10 mm, especially 5.9 mm, 6 mm, 9.9 mm or 10 mm. The outer diameter of the rear, broader section may be in a range between 7 and 12.5 mm. Especially the diameter pairs (outer diameter of front section/outer diameter of rear section) of 5.9/7.5 mm, 6/8 mm, 9.9/12.5 mm and 10/12 mm can thereby be realized in a preferred manner. The radius of the bulged free end 13 of the inner extension may be 0.4 mm. The same refers to the radius in the groove base.

Figure 2:
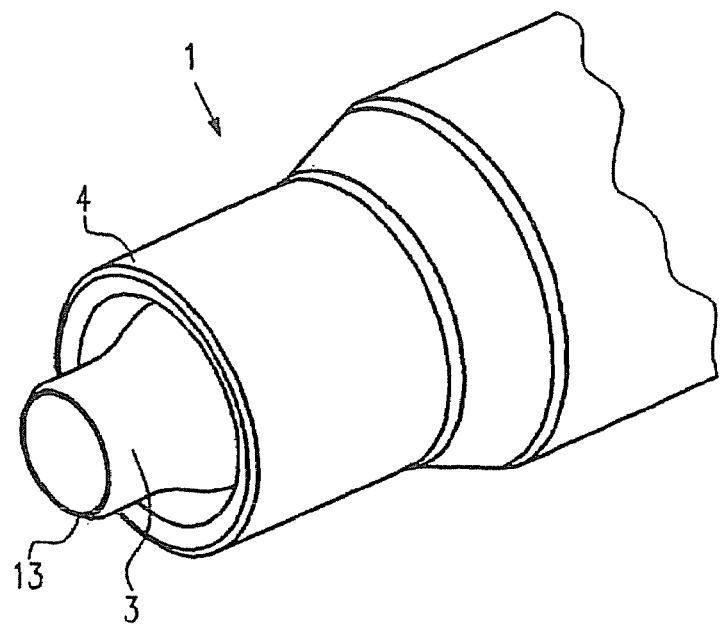
FIG. 2 shows a perspective view of the connection of the connecting device shown in FIG. 1 provided for the friction welding.

For connecting a line end to the connecting device shown in FIG. 1 to 3, the line end is stuck onto the inner extension 3, wherein the line end, when pushed on, is expanded in the region of the transition 8 and then maintains the expanded state in the region of the rear section 7. The connecting device and/or the pipe are thereupon brought into a rotatory motion by which frictional heat is generated between the end of the pipe and the connecting device in the region of the receiving portion 5. Thus, a welding connection is produced between the end of the line and the connecting device.

The connecting device according to the invention has the advantage that the shape of the curve of wall 8a in the transitional region 8 can be adapted to the respective mounting requirements, so that the respective mounting processes can be process-optimized.

The invention claimed is:

1. A connecting device for connecting lines, comprising:
at least two connections, each being provided on an end of the device, with at least one connection thereof comprising:
a radially inner extension and a radially outer extension, the outer extension surrounding a portion of the inner extension, that form a receiving portion for a line end, wherein the inner extension has a first section and a second section with a wall thicker than a wall thickness of the first section, the inner extension protruding in a longitudinal direction beyond a terminal end of the outer extension, the terminal end of the outer extension defining an opening to an entrance port; and
the inner extension comprising a transition provided between the two sections of the inner extension, and the profile of the transition being curve-shaped in the longitudinal direction of the connecting device, a section of the transition adjacent the first section of the inner extension has a concave curved surface in profile, a section of the transition adjacent the second section of the inner extension has a convex curved surface in profile, an inflection point is disposed between and directly adjoining the curved concave surface and the curved convex surface of the sections of the transition, the inflection point being disposed at the opening to the entrance port in a common plane with the terminal end of said outer extension.

2. Connecting device according to claim 1, wherein the curved concave and the curved convex section of the wall are approximately equally long.

3. Connecting device according to claim 1, wherein a free end of at least one of the extensions is rounded.

4. Connecting device according to claim 1 adapted for use in fluid conveying lines of a motor vehicle.

5. Connecting device according to claim 1, wherein the device is a quick-connector.

6. Connecting device according to claim 1, wherein the other of said at least two connections includes a recess.

7. Connecting device according to claim 1, wherein the inflection point is located to intersect a cross-section at the opening of the entrance port of the connecting device perpendicular to the longitudinal direction.

8. Connecting device according to claim 1, comprising:
a line frictionally welded to the at least one connection.

9. Connecting device according to claim 1, wherein the inflection point is located to intersect a cross-section at the terminal end of the outer extension of the connecting device perpendicular to the longitudinal direction.

10. Method for connecting lines, comprising the steps:
pushing a line end into the receiving portion of the connecting device according to claim 1, and
performing a relative motion between the line end and the connecting device so as to generate frictional heat for welding the line end together with the receiving portion of the connecting device.

* * * * *